TAPE TRANSPORT SYSTEM

Filed Oct. 14, 1966 6 Sheets-Sheet 1

INVENTOR.
ALEXANDER R. MAXEY

BY
FOWLER, KNOBBE
& MARTENS
ATTORNEYS.

INVENTOR.
ALEXANDER R. MAXEY

BY
FOWLER, KNOBBE
& MARTENS
ATTORNEYS.

INVENTOR.
ALEXANDER R. MAXEY
BY
FOWLER, KNOBBE
& MARTENS
ATTORNEYS.

July 2, 1968 A. R. MAXEY 3,390,841

TAPE TRANSPORT SYSTEM

Filed Oct. 14, 1966 6 Sheets-Sheet 4

INVENTOR.
ALEXANDER R. MAXEY

BY
FOWLER, KNOBBE
& MARTENS
ATTORNEYS.

INVENTOR.
ALEXANDER R. MAXEY

BY
FOWLER, KNOBBE
& MARTENS
ATTORNEYS.

INVENTOR.
ALEXANDER R. MAXEY
BY
FOWLER, KNOBBE
& MARTENS
ATTORNEYS.

3,390,841
TAPE TRANSPORT SYSTEM

Alexander R. Maxey, Newark, Calif., assignor, by mesne assignments, to Allan R. Fowler, Orange, Calif., trustee Filed Oct. 14, 1966, Ser. No. 586,804
10 Claims. (Cl. 242—55.12)

This invention relates to tape recording and playback equipment, and, more particularly, to apparatus for controlling the tension in the tape as it is transported from the supply reel past the head assembly and onto the take-up reel.

Some degree of tension control in tape transport systems has been achieved simply by driving the take-up reel at a predetermined speed, applying a predetermined amount of braking force to the supply reel, and taking up slack in the tape between reels with spring biased compliance arms. In order to assure more accurate control as is particularly necessary in professional quality equipment, however, devices have been developed to vary the speed of the take-up reel drive and the braking force on the supply reel in accordance with the amount of tension in the tape between reels at any given moment. This invention provides an improved system for carrying out those functions with improved results.

The regulating system contructed in accordance with the principles of this invention is relatively simple, yet it provides very reliable and sensitive tape tension control. The system is particularly advantageous in reversible tape transport systems because it uses the same mechanism to control the braking force on one reel when the tape moves in one direction and to control the take-up torque of that reel when the tape moves in the other direction. The transition upon starting, stopping, or reversing direction is extremely smooth and the tension of the tape is kept within reasonable limits even during rapid direction changes.

In accordance with the invention, a transmission pulley is rotatably mounted on the tape recorder chassis and coupled to the chassis by a clutch which prevents rotation of the transmission pulley in one direction. Another one-way clutch connected between the transmision pulley and the capstan permits the capstan to rotate independent of the transmission pulley in said one direction and drives the transmission pulley with the capstan in the opposite direction. A belt is operably connected around the tape reel pulley and the transmission pulley, and the tension in the belt is adjusted by a control means responsive to the amount of tension in the tape.

When the reel to which the belt is connected is used as a take-up reel, the capstan rotates the transmission pulley which in turn drives the belt and the tape reel pulley to rotate the take-up reel. When the tape direction is reversed so that the reel functions as a supply reel, the transmission pulley is locked against rotation so that friction between the belt and the transmission pulley brakes the tape reel pulley. In either mode of operation, the control means increases the tension in the belt when the tape tension decreases and decreases the belt tension when the tape tension increases, thereby varying the slippage so that the amount of braking force or the rate of the drive varies in accordance with the tape tension.

In order to regulate the drive speed and braking effect of both reels, a similar transmission pulley and belt arrangement connected to the other reel is controlled by another control means responsive to the amount of tension in the tape portion between the capstan and the other tape reel. In one embodiment of the invention, two separate capstans are used each having a separate transmission pulley, while in another embodiment a single capstan with two transmission pulleys is used.

In either embodiment, linkages preferably are provided between the right and left controllers so that tape tension changes on one side of the transport system not only cause correction of the drive or brake rate on that side, but also stimulate adjustment of the driving or braking arrangement on the other side of the tape transport in anticipation of corrections which will be required.

These and other objects and advantages of this invention will be apparent from the following detailed description when read with reference to the accompanying drawings, in which.

Figures 1, 5:
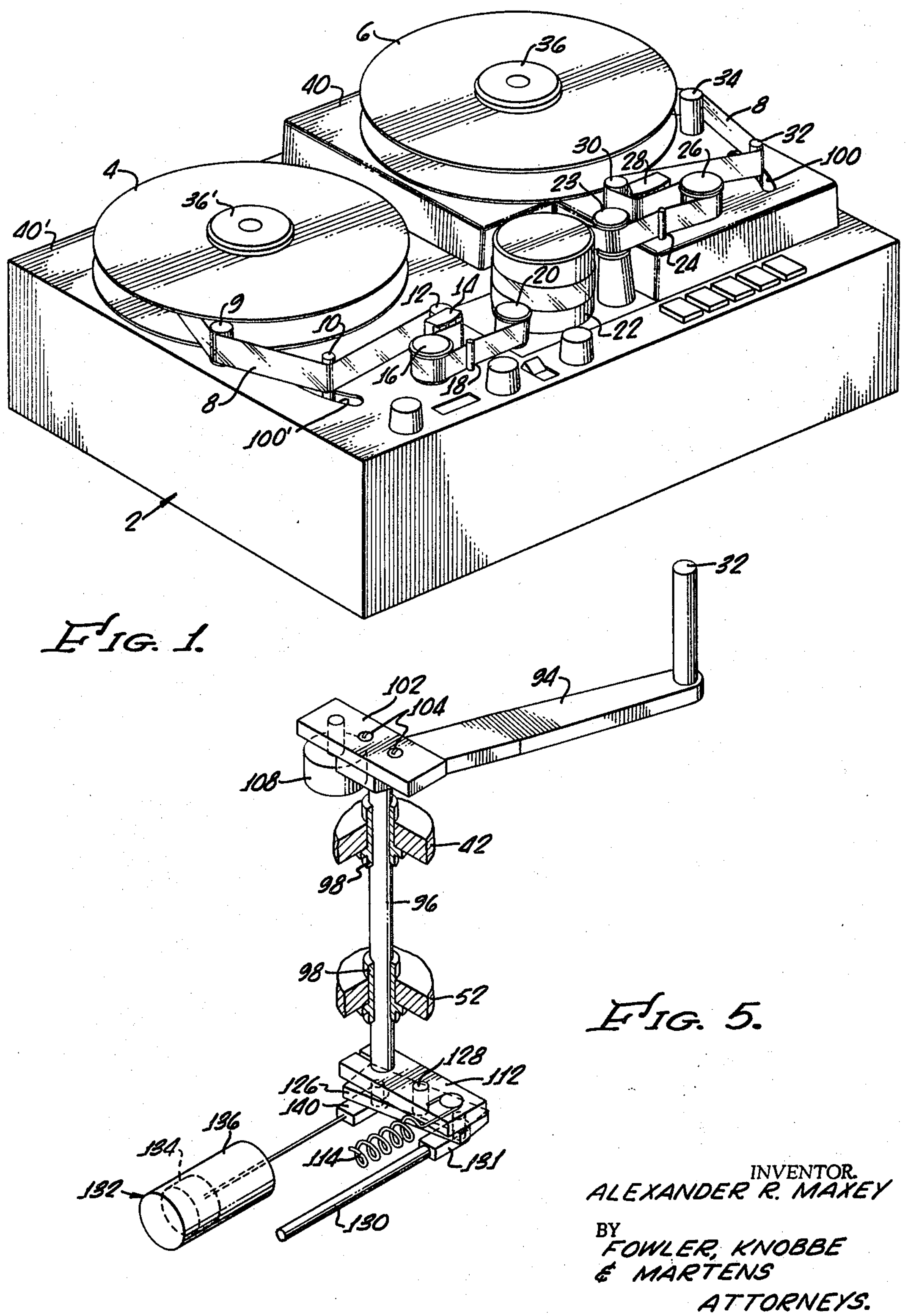
FIG. 1 is a perspective view of an exemplary tape recorder in which the tape tensioning system of this invention is used.
Figures 4, 4A:
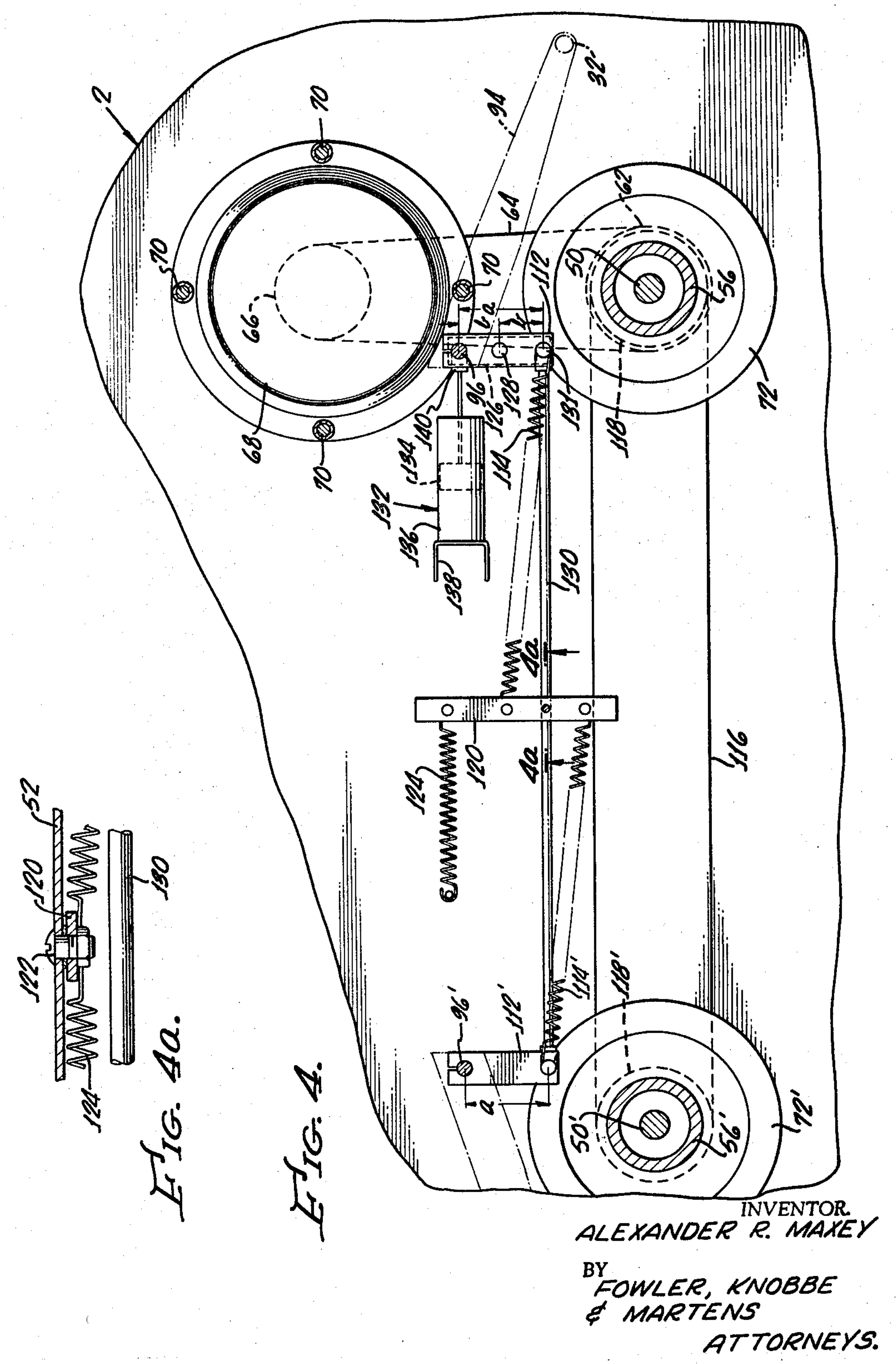
FIG. 4 is a plan view taken generally along lines 4—4 of FIG. 3 showing the interconnections between the right and left tensioning devices.
Figure 6:
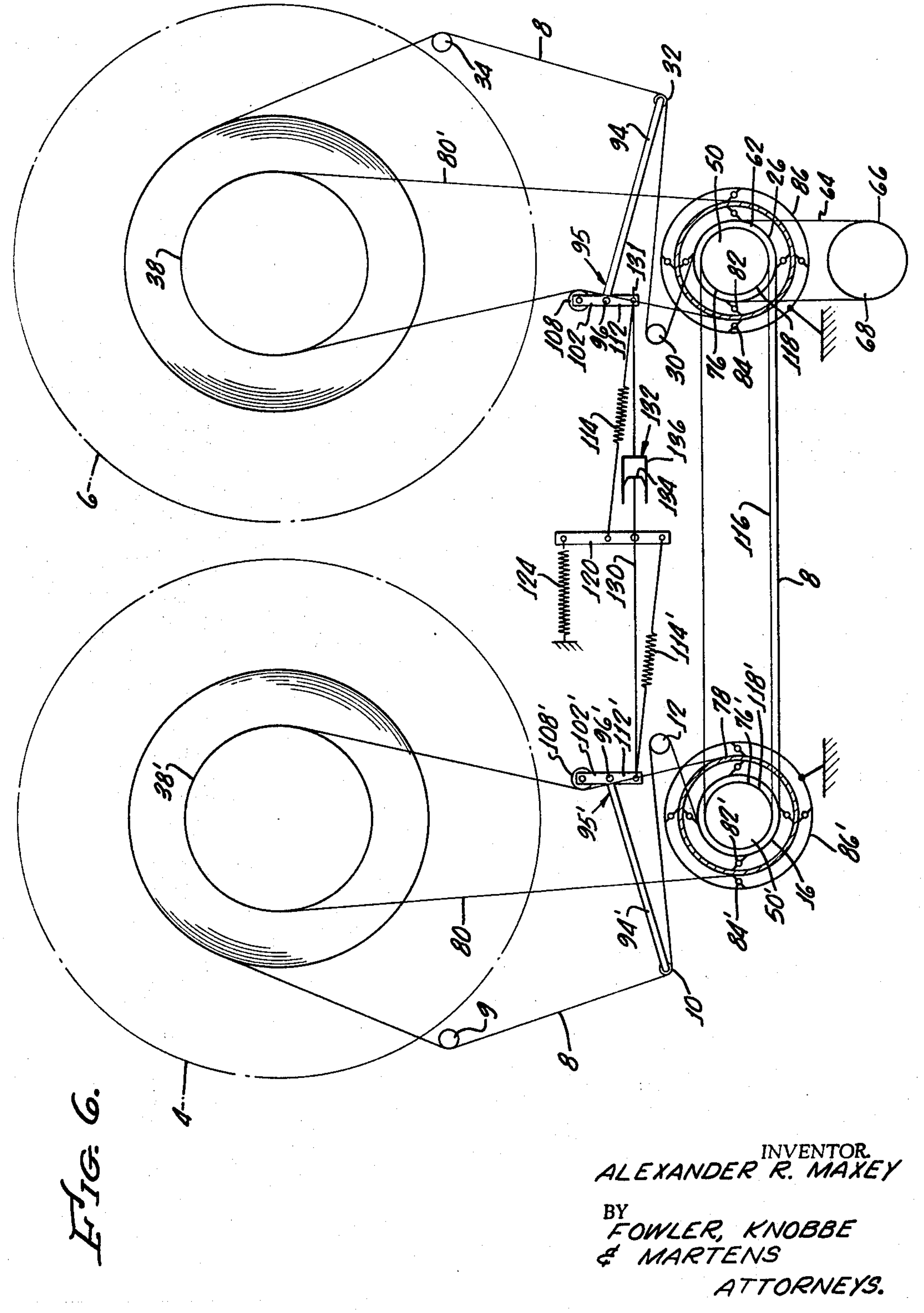
Figure 7:
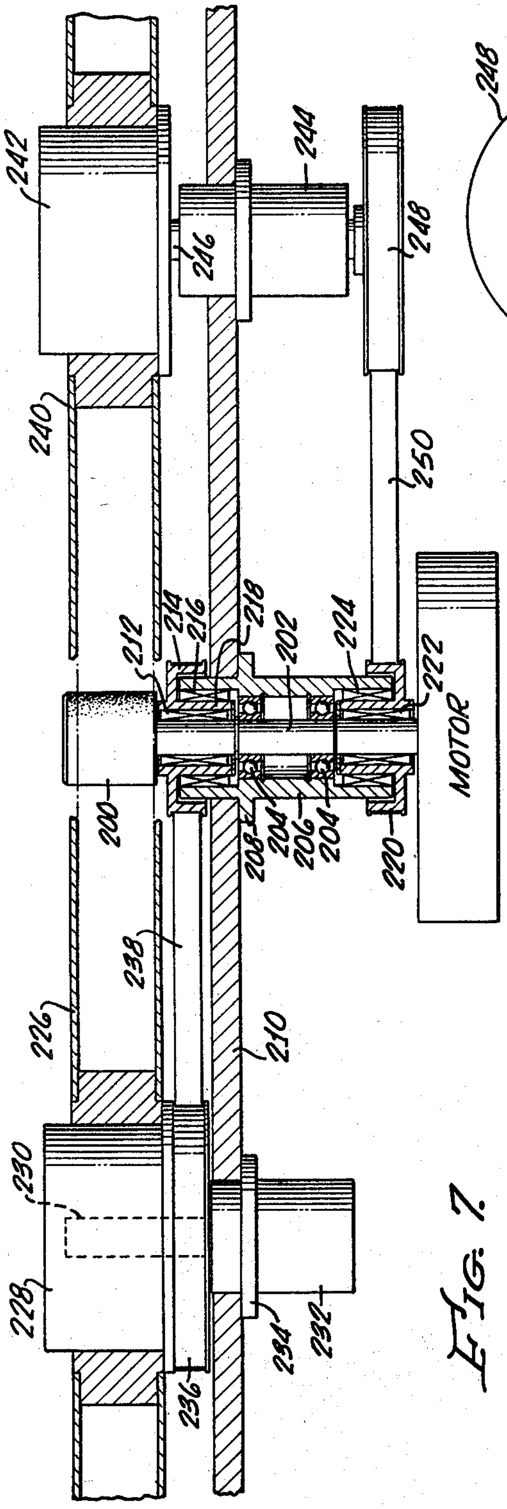
Figure 8:
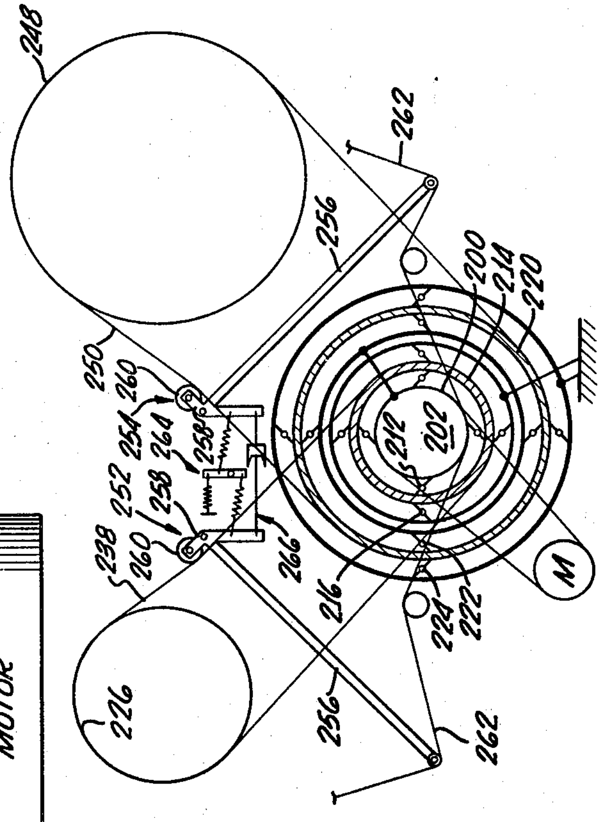

FIG. 4*a* is a section taken generally along lines 4*a*—4*a* of FIG. 4 showing the attachment of the interconnecting lever to the chassis;

FIG. 5 is a perspective view of one mechanical servo for adjusting belt tension responsive to tape tension, and also shows a portion of the interconnecting dampening system;

FIG. 6 is a schematic illustration of the functional relationship of the various parts of the tape transport and tensioning system;

FIG. 7 is a vertical section through the capstan and tape reels of a modified embodiment of the tape transport and tensioning system of this invention in which only a single capstan is used; and, FIG. 8 is a schematic illustration of the functional relationship of the elements of the tape transport and tensioning system of FIG. 7.

By way of illustration, the invention will be described with reference to an exemplary video tape recorder although the tape transport system is not limited to video tape recorders in its applicability.

Referring to FIG. 1, the exemplary video tape recorder includes a cabinet 2 having a pair of tape reels 4 and 6 mounted on it. Tape 8 extends from the left reel 4 past a guide roller 9, around the post 10 of a compliance arm, around another guide roller 12, past a head assembly 14, around a capstan 16, past a guide post 18, around a third guide roller 20, and then is wrapped helically around a scanning assembly or drum 22. From the upper portion of the scanning assembly, the tape goes around a guide roller 23, past another guide post 24, around a second capstan 26, past a second head assembly 28, around another guide roller 30, around the post 32 of another compliance arm, past another guide roller 34, onto the right reel 6. The right reel 6 and related elements are elevated with respect to those on the left because the tape 8 is elevated as it winds helically on the scanner 22. The details of the scanning assembly 22 are disclosed in my co-pending application Serial No. 536,107, filed March 21, 1966.

In the forward mode of operation, the capstans 16 and 26 both rotate counterclockwise to pull the tape from the left reel or supply reel 4 toward the right reel or take-up reel 6. The capstan drive is reversible to rotate the capstans clockwise and move the tape from the right reel 6 to the left reel 4 in which case the right reel becomes the supply reel and the left reel becomes the take-up reel.

First, the right drive and tensioning device will be described with particular reference to FIGS. 2 and 3. An upper mounting plate 42 and a lower mounting plate 52 which are each part of the recorder chassis, are disposed below the cabinet top 40, and are rigidly connected to the cabinet. The right tape reel 6 is removably placed on a hub 36 above the cabinet top 40 and is rotationally keyed to the hub. A reel pulley 38 disposed between the cabinet top 40 and the upper mounting plate 42 is connected to the hub 36 by an integral neck 44, and the entire hub and pulley assembly is rotatably mounted by ball bearings 46 on a shaft 48 which is attached to the upper mounting plate 42 and extends upwardly through the neck 44.

The capstan 26 is fixed on the upper end of a vertical shaft 50 which extends down through the cabinet top 40 and the mounting plates 42 and 52. The capstan shaft 50 is rotatably mounted on the mounting plates by ball bearings 54 received in a tubular housing 56 which has a pair of flanges 58 and 60 fixed to the upper 42 and lower 52 mounting plates respectively. A capstan pulley 62 fixed on the bottom of the capstan shaft 50 is operably connected by a drive belt 64 to the pulley 66 of an electric motor 68 which is suspended from a bracket 70 beneath the lower mounting plate 52. The motor 68 is preferably a direct current motor which is reversible and provides good torque at both low speed and high speed so that the recorder may be run in either direction both at a low speed for recording and playback and a high speed for rewind. A flywheel 72 fixed on the capstan shaft 50 above the capstan pulley 62 stabilizes the rotational speed of the capstan. The capstan 26 has a friction material 74 on its peripheral surface to grip the tape 8 and pull it past the capstan as the capstan rotates.

A transmission pulley 76 is disposed coaxially around the capstan shaft 50 above the upper mounting plate 42 and includes an integral elongate collar 78 which extends downward along the shaft 50. A belt 80 extends around the transmission pulley 76 and the reel pulley 38 to operatively connect them. The transmission pulley 76 is mounted on the capstan shaft 50 by an over-running or one-way clutch 82 which engages to drive the transmission pulley counterclockwise when the capstan shaft rotates counterclockwise, but permits the capstan shaft to rotate clockwise independent of the transmission pulley.

The over-running clutch 82 will not be described in detail as it is a commercially available item, for example a cup roller clutch such as is sold by the Torrington Company Bearings Division, Torrington, Conn., as their RC or RCB series is suitable. Briefly, such a clutch has an outer shell which bears on the transmission pulley 76 and a plurality of roller bearings which contact the shaft 50 and rotate freely when the shaft 50 rotates clockwise. On the other hand, when the shaft 50 rotates counterclockwise, the rollers are wedged between the shaft and inclined surfaces on the interior of the outer shell so that the rollers cannot rotate and the shaft 50 is locked to the transmission pulley 76 to drive the pulley 76 counterclockwise with the shaft. However, the term one-way clutch as used herein, is not intended to be limited to the use of such a roller type clutch, but includes any clutch which serves the purpose of permitting free rotation of the shaft 50 independent of the transmission pulley 76 in one direction and driving the transmission pulley 76 with the shaft 50 in the other direction.

A second one-way clutch 84 is coupled between the collar 78 of the transmission pulley and a sleeve 86 which fits loosely in an opening 88 through the mounting plate 42 and is rotationally fixed to the mounting plate by a stud 90 extending into a radial slot in the sleeve flange. The loose fit of the sleeve 86 accommodates any eccentricity of the one-way clutches 82 and 84. The second over-running clutch 84 is similar to the first but is arranged to permit free counterclockwise rotation of the transmission pulley 76 relative to the mounting plate 42 and to lock the transmission pulley against clockwise rotation.

Figure 2:
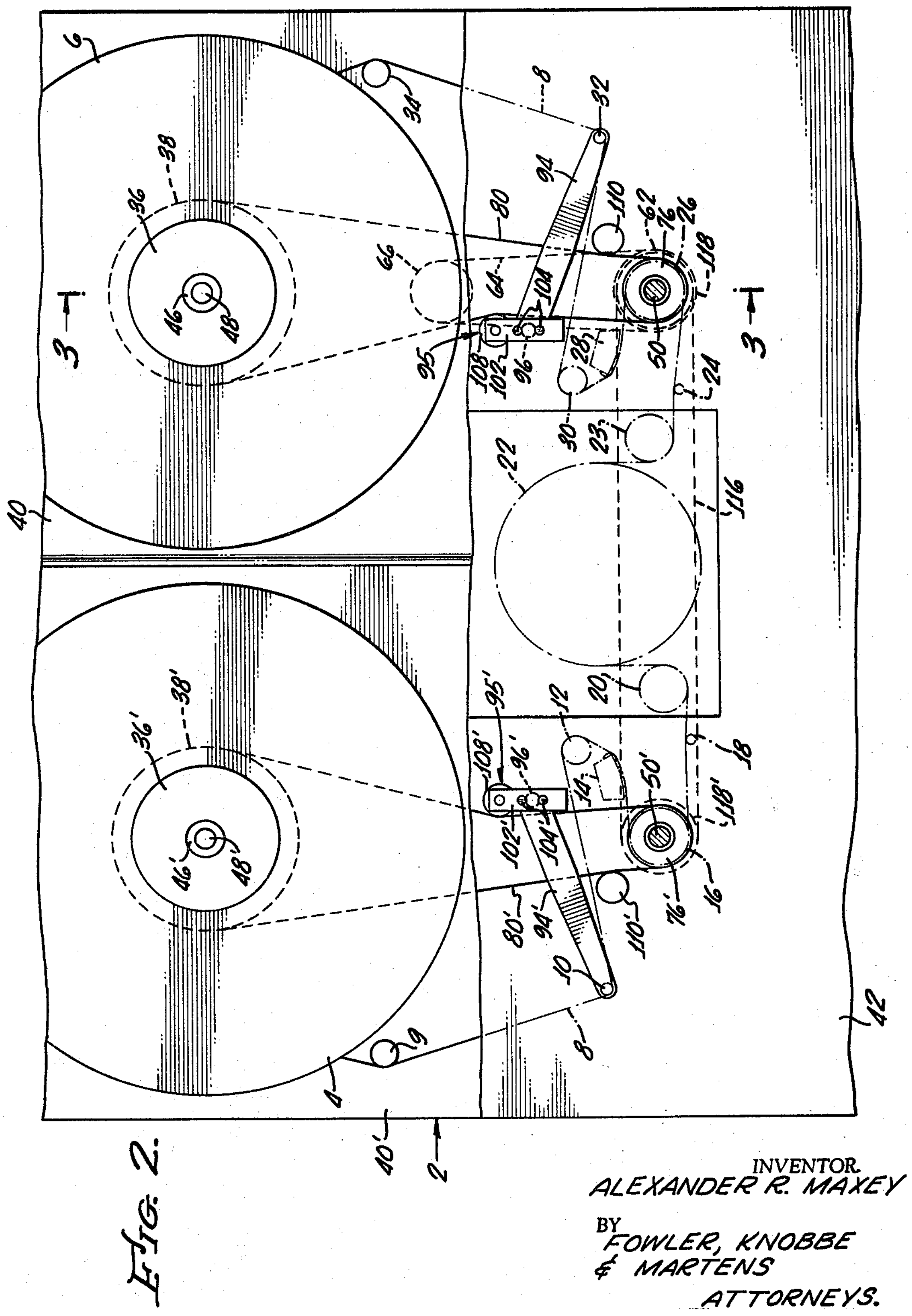
FIG. 2 is a partial plan view of the tape recorder of FIG. 1 with portions of the cabinet removed to illustrate the tape tensioning system.
Figure 3:
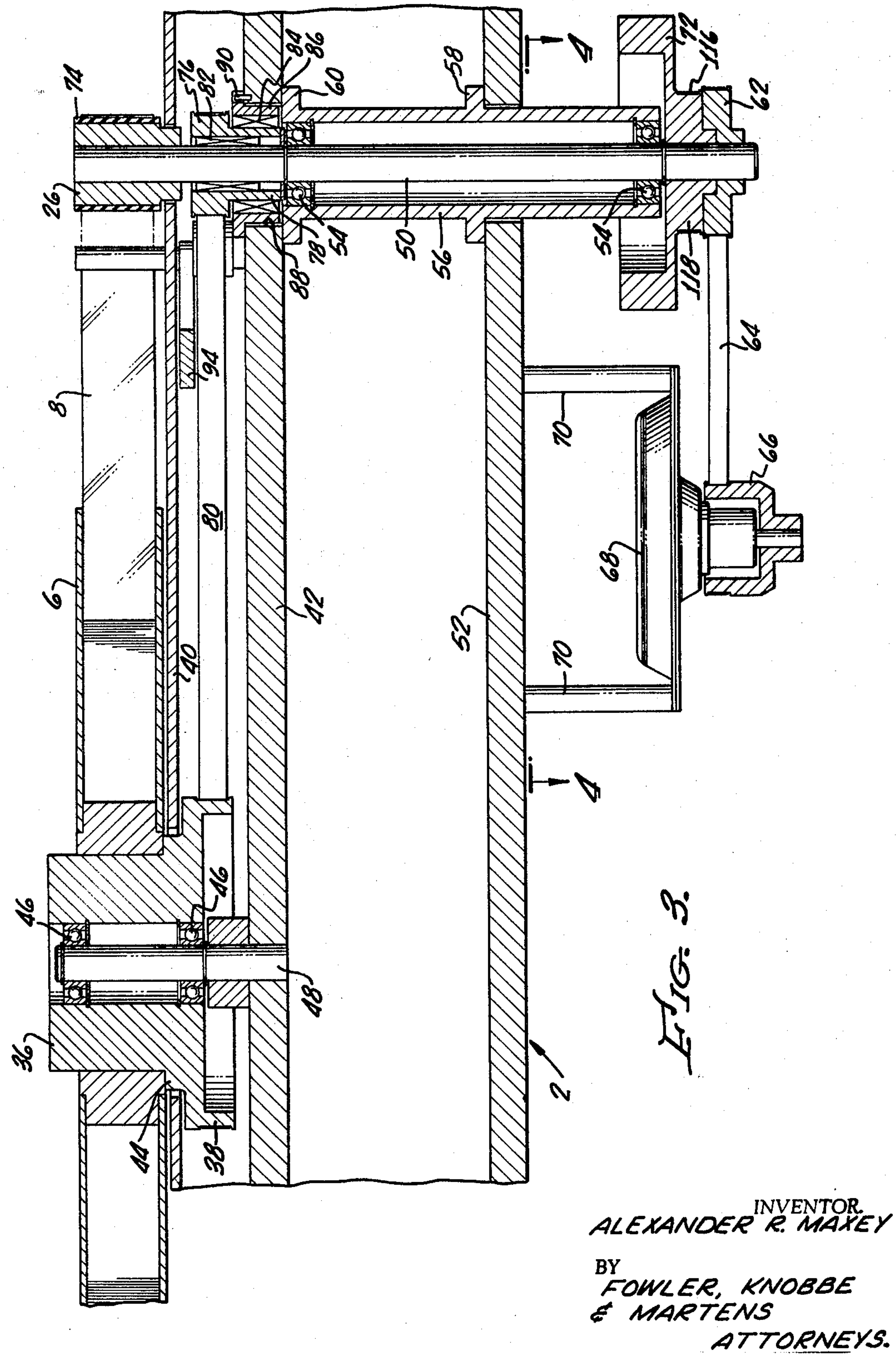
FIG. 3 is a vertical section through the tape transport system taken generally along lines 3—3 of FIG. 2 illustrating the capstan structure and other details of the tensioning system.

Referring now to FIGS. 2, 3 and 5, the right compliance arm 94 is part of a mechanical servo assembly 95 which adjusts the tension in the belt 80 responsive to variations in the tension of the tape 8. The compliance arm 94 is fixed to a long pivot post 96 which pivots in a pair of sleeve bearings 98 attached to the upper and lower mounting plates 42 and 52. A post 32 at the distal end of the compliance arm 94 extends upward through a slot 100 in the cabinet top (see FIG. 1) and engages the tape 8. A belt tensioning arm 102, which extends outward from the axis of the pivot post 96 is connected to the compliance arm 94 by screws 104. A roller 108 depending from the distal end of the arm 102 engages the belt 80 connecting the transmission pulley 76 and the reel pulley 38, to adjust the tension in the belt 80.

With the belt tensioning arm 102 in its furthest counterclockwise position, the belt 80 is relaxed and is sufficiently loose that it slips freely on the transmission pulley 76 so that the reel pulley 38 is, in effect, not coupled to the transmission pulley 76. As the arm moves clockwise, the tension in the belt 80 increases and the amount of slippage decreases. Preferably, even in the most extreme clockwise position, the belt 80 still slips somewhat on the transmission pulley 76. Initial tension in the belt 80 can be adjusted by shifting the position of an adjustable mounted roller 110 which bears on the belt. It has been found suitable to use a stainless steel transmission pulley 76 and a polyester belt 80 such as is currently sold under the trademark "Mylar."

A crank arm 112 fixed to the lower part of the pivot post 96 extends in the opposite direction from the belt tensioning arm 102, and has a tension spring 114 connected to its outer end. As will be described hereinafter, the spring 114 urges the right crank 112, and therefore the belt tensioning arm 102 and compliance arm 94, in the clockwise direction.

The left reel hub 36' and pulley 38' assembly, capstan 16 and transmission pulley 76' assembly, connecting belt 80' and mechanical servo assembly 95 are all mirror images of those corresponding portions of the right assemblies described above, except that the left capstan shaft 50' and pivot post 96' are shorter since the left portion of the cabine top 40' is just above the lower mouting plate 52. Therefore, the upper mounting plate 42 is eliminated and those parts which are mounted in the upper plate on the right side are mounted on the lower plate on the left side. The same motor 68 drives both capstan assemblies through a belt 116 operably connected around a pulley 118 on the flywheel 72 of each capstan shaft, although in some recorders it is preferred to use a separate motor for each capstan. As the left is a mirror image of the right, the left transmission pulley 76' is driven clockwise with the left capstan shaft 50' and is locked against counterclockwise rotation.

The operation of the above-described portions of hte apparatus will be explained with particular reference to FIG. 6. It should be understood that the diagram of FIG. 6 is schematic only and is not intended to be to scale or to include all the elements.

First, assuming that the motor 68 is energized to rotate the capstans 16 and 26 in the counterclockwise direction, the right tape reel 4 functions as a take-up reel and the left reel 6 functions as supply reel since the tape 8 moves from left to right. Looking first to the right half of the transport assembly, in this mode of operation, the transmission pulley 76 is driven counterclockwise with the capstan shaft 50 through the engagement of the one-way clutch 82. Rotation of the transmission pulley 76 drives the tape reel 6 counterclockwise because of the interconnecting belt 80, thus pulling the tape 8 onto the reel 6.

If the take-up reel 6 rotates too fast, the tension in the tape portion between the right capstan 50 and the right reel 6 increases thereby pulling the right compliance arm 94 counterclockwise against the urging of the spring 114 to relieve the tension in the tape. As the compliance arm 94 moves counterclockwise, the belt tensioning arm 102 also moves counterclockwise, thereby relieving some of the pressure of the roller 108 on the belt. As the tension in the belt 80 is relieved, slippage of the belt on the rotating transmission pulley 76 increases, thereby slowing down the rate of rotation of the take-up pulley 38 and reel 6.

On the other hand, if the slippage is excessive so that the take-up pulley 38 is not rotating fast enough, the tension in the tape between the capstan 26 and the take-up reel 6 decreases causing slack in the tape 8. The compliance arm 94 rotates clockwise about the pivot post 96 to take-up the slack, thereby causing the belt tensioning roller 108 to increase the tension in the belt 80. That increase in the belt tension reduces the slippage of the belt 80 on the rotating transmission pulley 76, thereby increasing the speed of the take-up reel 6. In practice, an equilibrium point is soon established at which a selected amount of tension is maintained in the right tape portion.

In the reverse operation, the capstans 16 and 26 are driven clockwise so that the right reel 6 functions as a supply reel as the tape 8 goes from right to left. In this mode of operation, the right transmission pulley 38 remains stationary since it is locked against rotation in a clockwise direction by the over-running clutch 84. As the tape is pulled off the supply tape reel 6, it puts torque on the reel and rotates it by slipping the belt 80 with respect to the stationary transmission pulley 76. The friction between the belt 80 and the transmission pulley 76 provides a braking force to resist rotation of the tape reel 6 and maintain tension in the tape between the reel and the capstan 26. If the right supply reel rotates too freely, the tape comes off the reel too fast and the tension in the tape portion between the supply reel 6 and the capstan 26 slackens so that the right compliance arm 94 pivots clockwise about the pivot post 96 under the urging of the spring 114 to take up the slack. As the compliance arm 94 pivots clockwise, the belt tensioning arm 102 also pivots clockwise forcing the roller 108 into tighter contact with the belt 80 to increase the belt tension. This increase in tension increases the friction between the stationary right transmission pulley 76 and the right belt 80 so that the braking force is increased to slow the supply reel 6.

If, on the other hand, the braking force is too great so that too much tension develops in the tape portion between the right supply reel 6 and the capstan 26, the compliance arm 94 is forced counterclockwise by the tape tension. As the compliance arm moves counterclockwise, the belt tensioning roller 108 also moves counterclockwise about the pivot post 96 to relieve tension from the belt 80 thereby relieving friction between the belt 80 and the stationary transmission pulley 76, and reducing the braking force.

The operation of the left half of the transport assembly is the same as that described above for the right half. When the capstans 16 and 26 are rotating clockwise so that the left tape reel 4 functions as a take-up reel, the left transmission pulley 76′ is driven clockwise with the capstan 16 to drive the take-up reel 4. The speed of the take-up reel is regulated by varying the tension in the belt 80′ responsive to the tension in the tape 8 between the left capstan 16 and the left reel 4 in the same manner as described with reference to the right half of the transport assembly, except of course that the compliance arm 94′ and belt tensioning arm 102′ pivot counterclockwise to increase the speed of the take-up reel and clockwise to decrease its speed. Similarly, when the capstans 16 and 26 are rotating counterclockwise so that the left reel 4 is functioning as a supply reel, the left transmission pulley 76′ is locked against rotation by the one-way clutch 84′ and, therefore, friction between the transmission pulley 76′ and the belt 80′ provides the braking force on the supply reel 4. The amount of the braking force is regulated by moving the belt tensioning roller 108′ responsive to tension in the tape 8 through the mechanical servo mechanism.

As the amount of tape on the supply reel decreases and the amount on the take-up reel builds-up, the speed of rotation of the supply reel must increase and the speed of rotation of the take-up reel must decrease. In addition, the length of the moment arm through which tape tension is applied to the supply reel continuously decreases while the length of the moment arm through which the take-up reel applies tension to the tape continuously increases. Irregardless the tension in the tape is maintained relatively constant because each compliance arm and its related belt tensioning roller act together as a servo mechanism to adjust the braking force on the supply reel and the torque of the take-up reel responsive to the amount of tension in the tape.

Referring now to FIGS. 4 and 4*a*, the biasing springs 114 and 114′ are each connected to an interconnecting lever 120 which is pivotally mounted on the lower plate 52 by a rivet 122 midway between the points of connection of the springs 114 and 114′. A third spring 124 connected between one extreme end of the lever 120 and the mounting plate maintains tension in the biasing springs 114 and 114′. The springs 114 and 114′ bias the compliance arm posts 10 and 32 and belt tensioning rollers 108 and 108′ into engagement with the tape 8 and belt 80′ respectively. Moreover, the interconnection of the springs 114 and 114′ through the lever 120 interconnects the right and left servo mechanisms 95 and 95′ so that movement of one causes movement in the other.

Referring again to FIG. 6, if, for example, the tape is moving from the left reel 4 to the right reel 6, and because of an irregularity on the left reel the tension is momentarily increased in the left portion of the tape, the left compliance arm 94′ pivots clockwise to relieve the tension. This movement pulls the left biasing spring 114′ and pivots the interconnecting lever 120 clockwise to reduce the tension in the right biasing spring 114 and relieve the tension in the right portion of the tape.

On the other hand, if the left compliance arm 94 moves downwardly because of a momentary slacking of tension in the left tape portion, the spring system causes the right compliance arm 94 to pivot downwardly and increase the tension on the right side. Any movement of the right compliance arm 94 similarly effects a movement of the left compliance arm 94′ so that momentary slacking of tape tension on either side of the assembly is accompanied by a rapid take-up of tension on the other side, and momentary increase in tape tension on either side is accompanied by a rapid relief of tension on the other side. This arrangement coordinates the tension on opposite sides of the assembly, and in actual practice has been found to hold the tension across the scanning assembly substantially constant independent of momentary changes in tension in the tape portions on either side.

The two mechanical servo systems are also interconnected by a dampening system which is shown most clearly in FIGS. 4 and 5. A dampener lever 126 is pivotally mounted on the underside of the right crank arm 112 by a pin 128 extending through the center of the lever 126 and the center of the crank arm 112. One end of an elongate rigid rod 130 is connected to the end of the lever 126 at 131 and extends across to connect to the left servo mechanism adjacent the point of connection of the biasing spring 114′. A dashpot mechanism 132 includes a piston 134 which is connected to the other end of the dampener lever 126 and a cylinder 136 which is fixed to the lower mounting plate 52 of the chassis by a bracket 138. The dashpot 132 is arranged to resist or dampen movement of the piston 134 toward the right in FIGS. 4 and 5 and permit free movement of the piston toward the left. As such one-way dashpots are well-known in the art and are standard items available commercially, its structure will not be described in detail.

As the right compliance arm 94 pivots clockwise to take up slack, thereby pivoting the right crank arm 112 clockwise, the pivot pin 128 moves to the left in FIGS. 4 and 5. However, as the piston 134 is free to move to the left in the cylinder 136, the dampener lever 126 merely pivots counterclockwise about the point of connection 131 to the rod 130 and does not shift the rod. If instead the left compliance arm 94' moves counterclockwise to take up slack in the tape, the rod 130 is moved to the right by the left crank arm 112. However, this merely pivots the dampener lever 126 counterclockwise about the pivot pin 128, and has no effect on the right servo mechanism, as the dashpot piston 134 moves to the left.

On the other hand, if the right compliance arm 94 moves rapidly away from the tape or counterclockwise responsive to an increase in tension of the tape, the right crank arm 112 pivots counterclockwise thereby moving the pivot pin 128 to the right. As the piston 134 resists movement to the right, the dampener lever 126 pivots counterclockwise about the end 140 of the piston 134 thereby pulling the rigid rod 130 to the right. This movement of the rod to the right pivots the left servo mechanism counterclockwise so that the left complance arm 94' takes up slack in the tape, and increases tension in the left belt 80' to speed the take-up reel 4. Similarly, if the left compliance arm 94' moves rapidly clockwise responsive to a rapid increase in tension on the left side, the rod 130 moves to the left and, as the piston 134 resists movement to the right, the dampener lever 126 rotates clockwise about the end of the piston 140 and moves the pivot pin 128 and the right servo mechanism clockwise to take-up slack in the right side of the tape and speed the right reel.

The dampened interconnection is advantageous when starting the tape transport system or reversing its direction. For example, if the transport system has been operating from left to right and its mode of operation is suddenly reversed, the inertia of the system will be such that the right tape reel will not instantaneously reverse its direction to act as a supply reel. The right supply reel will either still be moving counterclockwise, or will not yet be moving fast enough clockwise, resulting in a rapid increase in tape tension on the right side. This rapid tension increase causes the right servo mechanism 95 to pivot counterclockwise and through the interconnecting dampening system also causes the left servo mechanism 95' to pivot counterclockwise. The left tape reel which is now to be a take-up reel, will not yet have fully shifted from counterclockwise rotation in its previous supply reel function to clockwise rotation in its take-up reel function. However, the counterclockwise shifting of the left servo caused by the interconnecting rod 130 increases the tension in the left belt 80' thereby causing the clockwise rotation of the transmission pulley 76' to accelerate the reversal of the left reel. Moreover, the counterclockwise rotation of the left compliance arm takes up the slack in the left portion of the tape which results from the time lag in reversing the reel.

Thus, the dampened interconnecting system smooths the transition during direction reversals or stopping or starting. Moreover, the dashpot 132 stabilizes the system so that the servo mechanisms do not oscillate too long in search of equilibrium.

If movement of either compliance arm toward the tape is relatively slow, as opposed to the rapid movement upon start-up or reversal, the dashpot piston 134 dampens the movement but moves slowly to the right in the cylinder 136 to take up the movement, so that the connecting rod 130 does not rotate the other servo mechanism.

The length $a$ of the each crank arm 112 and 112' and the dampener lever 126 is twice the dimension $b$ between the right pivot post 86 and the dampener lever pivot pin 128, which in turn is equal to the dimension $b$ from the dampener lever pivot pin 128 to the rod 130. Therefore, a torque F times $a$ rotating the left crank arm 112' clockwise exerts a force F on the rod 130 and thus on the end 131 of the dampener lever 126. On the other hand, a similar torque of F times $a$ or F times $2b$ rotating the right crank arm 112 counterclockwise exerts a force equal to 2F on the pivot pin 128. Thus, a given torque applied to the right pivot post 96 applies force to the pivot pin 128 which is twice the force applied to connection 131 by the same quantity of torque applied to the left pivot post. However, the lever arm between the connection 131 and the dashpot is twice as long as that between the pin 128 and the dashpot so that any given torque applies the same force to the dashpot no matter at which of the two pivot posts 96 or 96' the torque is applied. Thus, the dashpot resists movement of either servo mechanism equally.

A modified embodiment of the invention is illustrated in FIGS. 7 and 8. The modified embodiment differs from the embodiment of FIGS. 1–6 primarily in that a single capstan is used in lieu of the dual capstans of the other embodiment.

Referring first to FIG. 7, the capstan 200 is mounted on a vertical shaft 202 which is rotatably mounted on ball bearings 204 received in a tubular housing 206. The housing 206 has a flange 208 which abuts the mounting plate 210 of the chassis and is fixed to it. A one-way clutch 212 near the upper end of the capstan shaft 202 rotatably mounts an upper transmission pulley 214 on the shaft and is arranged to permit the capstan shaft 202 to rotate counterclockwise independent of the transmission pulley 214 and to lock the transmission pulley 214 to the capstan shaft 202 when the capstan shaft is rotated clockwise. A second one-way clutch 216 inserted between a collar 218 on the transmission pulley 214 and the housing locks the upper transmission pulley against counterclockwise rotation.

A lower transmission pulley 220 is mounted on the lower portion of the capstan shaft 202 by a one-way clutch 222 which permits the capstan shaft to rotate clockwise independent of the lower transmission pulley 220 and drives the lower transmission pulley counterclockwise with the capstan when the capstan shaft rotates in that direction. Another one-way clutch 224 inserted between the lower transmission pulley 220 and the housing 206 locks the lower transmission pulley against clockwise rotation.

The left tape reel 226 is inserted on a hub 228 to which it is rotationally fixed. A shaft 230 depending from the hub 228 is rotatably mounted on bearings (not shown) in a journal box 232 which is fixed to the mounting plate 210 by a flange 234. A tape reel pulley 236 connected on the shaft 230 is operatively connected to the upper transmission pulley 214 by a belt 238.

The right tape reel 240 is also rotationally fixed on a hub 242 which rotates in a journal box 244 mounted on the mounting plate 210. The right reel shaft 246 extends through the journal box 244 and has a reel pulley 248 fixed on its lower end. A belt 250 extends around the reel pulley 248 and the lower transmission pulley 220 to operatively connect them.

An electric motor connected to the capstan shaft and suitably fixed to the chassis rotates the capstan shaft in either direction as selected.

Reference will now be made to the diagram of FIG. 8 which, like that of FIG. 6, is not intended to be a construction drawing, but schematically illustrated the functional relationships of the various parts. As is shown in FIG. 8, left and right servo mechanisms 252 and 254 respectively each including a compliance arm 256, a belt tensioning arm 258 and a belt tensioning roller 260 are operatively connected to the belts 238 and 250 and tape 262 in much the same manner as in the embodiment of FIGS. 1–6.

As the capstan 200 is rotated counterclockwise in the forward mode of operation, the upper transmission pulley 214 is locked against rotation by the over-running clutch 216 and the left tape reel 226 which functions as a supply reel is braked by friction between the left belt 238 and the stationary upper transmission pulley 214. The amount of braking force is controlled by the left servo mechanism 252 responsive to the tension in the left tape portion in much the same manner as described above with reference to FIGS. 1–6. At the same time the lower transmission pulley 220 is driven counterclockwise by the over-running clutch 222, thereby operating the right belt 250 to drive the right tape reel 240 or take-up reel. The tension on the right belt 250 is controlled by the right servo mechanism 254 in response to the tension in the right tape portion in the manner described above.

It will be readily apparent that when the capstan 200 is rotated in the clockwise direction so that the right tape reel functions as a supply reel and the left tape reel functions as a take-up reel, the left belt 238 and servo mechanism 252 regulate the driving speed of the left reel responsive to the tape tension and the right belt 250 and servo mechanism 254 regulate the braking force on the right tape reel.

As is shown schematically in FIG. 8, a spring interconnecting system 264 and a dampener interconnecting system 266, functionally similar to those described with reference to FIGS. 1–6, are also provided in the embodiment of FIGS. 7 and 8. Thus, variations in the tape tension on either side effect the servo mechanism for the opposite side in the same manner as with the previously described embodiment.

While the invention has been described with reference to particular embodiments, the description should be considered exemplary not limiting, and the scope of the invention should be measured only in accordance with the following claims.

I claim:

1. Means for controlling the tape tension in a tape transport system including a tape reel pulley mounted on a chassis for rotation with a reel of tape, a capstan mounted for rotation on the chassis, a friction surface on the capstan for engaging the tape to move it from or toward the reel as the capstan rotates, and motor means operably connected to the capstan for rotation thereof, said tape tension controlling means comprising:
- a transmission pulley rotatably mounted on the chassis;
- first one-way clutch means operable connected between the transmission pulley and the capstan to rotate the transmission pulley in one direction when the capstan rotates in a first direction, said clutch permitting rotation of the capstan in the direction opposite to said first direction independent of the transmission pulley;
- second one-way clutch means operably connected between the transmission pulley and the chassis to permit rotation of the transmission pulley relative to the chassis in only said one direction;
- a belt operably connected around the tape reel pulley and the transmission pulley; and,
- control means for adjusting the tension in the belt responsive to the amount of tension in the tape to regulate slippage of the belt.

2. Means for controlling the tape tension in a tape transport system in accordance with claim 1, wherein:
- the capstan includes a rotary shaft; and,
- the first and second one-way clutch means, and the transmission pulley are each disposed coaxially about the rotary shaft with the first one-way clutch means intermediate the shaft and the transmission pulley, and the second one-way clutch means intermediate the transmission pulley and the chassis.

3. Means for controlling the tape tension in a tape transport system including a pair of tape reel pulleys each mounted on a chassis for rotation with a reel of tape, capstan means including at least one capstan mounted for rotation on the chassis and having a friction surface for engaging the tape to move it from one reel, past the capstan and onto the other reel as the capstan rotates, and reversible motor means for operating the capstan means, said tape tension controlling means comprising:
- first and second transmission pulleys each disposed in coaxial relationship with a capstan;
- first one-way clutch means operably connected between the chassis and the first transmission pulley to permit rotation of the first transmission pulley relative to the chassis in only one direction;
- second one-way clutch means operably connected between a capstan and the first transmission pulley to rotate the first transmission pulley with the capstan in said one direction, said second clutch permitting rotation of the capstan in the direction opposite to said one direction independent of the first transmission pulley;
- a first belt operably connected around the first tape reel pulley and the first transmission pulley;
- third one-way clutch means operably connected between the chassis and the second transmission pulley to permit rotation of the second transmission pulley relative to the chassis in only said opposite direction;
- fourth one-way clutch means operably connected between a capstan and the second transmission pulley to rotate the second transmission pulley with the capstan in said opposite direction, said second clutch permitting rotation of the capstan in said one direction independent of the second transmission pulley;
- a second belt operably connected around the second tape reel pulley and the second transmission pulley;
- first control means for adjusting the tension in the first belt responsive to the tensioin in the portion of the tape between the first reel and the capstan means to regulate slippage of the first belt; and,
- second control means for adjusting the tension in the second belt responsive to the tension in the portion of the tape between the second reel pulley and the capstan means to regulate slippage of the second belt.

4. Means for controlling the tape tension in a tape transport system in accordance with claim 3, wherein the capstan means comprise first and second separate capstans, the first transmission pulley and first and second clutch means being disposed in coaxial relationship with the first capstan, and the second transmission pulley and third and fourth clutch means being disposed in coaxial relationship with the second capstan.

5. Means for controlling the tape tension in a tape transport system in accordance with claim 3, wherein the capstan means comprise a single capstan having a rotary shaft, both of said transmission pulleys and all four of said clutch means being disposed in coaxial relationship with said shaft.

6. Means for controlling the tape tension in a tape transport system in accordance with claim 3, wherein each of the first and second control means comprises:
- tape tensioning means movably mounted on said chassis for engaging the portion of the tape which is between a respective reel and the capstan;
- belt tensioning means movably mounted on said chassis for engaging a respective one of said belts, said tape tensioner and said belt tensioner being so connected that the belt tensioner moves toward the belt as the tape tensioner moves toward the tape; and,
- spring means urging the tape and belt tensioning means against the tape and belt respectively.

7. Means for controlling the tape tension in a tape transport system in accordance with claim 6, and further comprising dampening means interconnecting said first and second control means to dampen movements of each tape tensioner away from the tape and move each tape tensioner toward the tape responsive to rapid movement of the other tape tensioner away from the tape, said dampening means permitting movement of each tape tensioner toward the tape without dampening and without affecting movement of the other arm.

8. Means for controlling the tape tension in a tape transport system in accordance with claim 3, and further comprising spring means interconnecting the first and second control means to adjust the tension in the portion of the tape between one reel and the capstan means responsive to variations in the tension in the portion of the tape between the other reel and the capstan means.

9. A tape transport system comprising:

a pair of reel pulleys each mounted on a chassis for rotation with a reel of tape;

a pair of capstans each having a rotary shaft mounted on the chassis and a friction surface for engaging the tape to move it from one reel past the two capstans, and onto the other reel;

reversible two-speed motor means for rotating the capstans together at a selected speed in either direction;

a transmission pulley mounted on each of the capstan shafts in coaxial relationship therewith;

an over-running clutch disposed between each transmission pulley and its associated capstan shaft and arranged so that one transmission pulley is driven in only one direction with its associated rotary shaft and the other transmission pulley is driven in only the other direction with its associated rotary shaft;

an over-running clutch disposed between each transmission pulley and the chassis and arranged so that each transmission pulley can be rotated only in the direction it is driven by its associated rotary shaft;

a belt operably connecting each reel pulley to the adjacent transmission pulley;

a pair of servo means each including a compliance arm, a belt adjustment arm, and a crank arm, each mounted on the chassis for pivotal movement about a respective axis, the three arms of each servo means being interconnected for movement together;

tape tensioning means at the distal end of each compliance arm for engaging the portion of the tape between a respective tape reel and its adjacent capstan;

belt tensioning means at the distal end of each belt adjustment arm engaging the belt connected to the adjacent reel pulley;

tension spring means on each crank arm urging the belt tensioners and tape tensioners toward the belts and tape respectively;

dampening means interconnecting said crank arms, said dampening means permitting each tape tensioner to move toward the tape independent of movement of the other tape tensioner and through a dampener pivoting each tape tensioner toward the tape in response to rapid pivoting of the other tape tensioner away from the tape.

10. A tape transport system in accordance with claim 9, wherein the tension spring means comprises:

an interconnecting lever pivotally mounted intermediate its ends on the chassis;

a first tension spring connected to the distal end of one crank arm and to the interconnecting lever on one side of the pivotal mount;

a second tension spring connected to the distal end of the other crank arm and to the interconnecting lever on the opposite side of the pivotal mount; and, a third spring connected to said interconnecting lever and to the chassis to resist the pull of the first and second springs.

References Cited

UNITED STATES PATENTS

| | | | |
|---|---|---|---|
| 2,745,604 | 5/1956 | Masterson | 242—55.12 |
| 3,332,635 | 7/1967 | Schuller et al. | 242—55.12 |

LEONARD D. CHRISTIAN, *Primary Examiner.*